Feb. 19, 1935.   A. V. BEDFORD   1,992,022
ELECTRICAL MEASURING APPARATUS
Filed Oct. 4, 1933
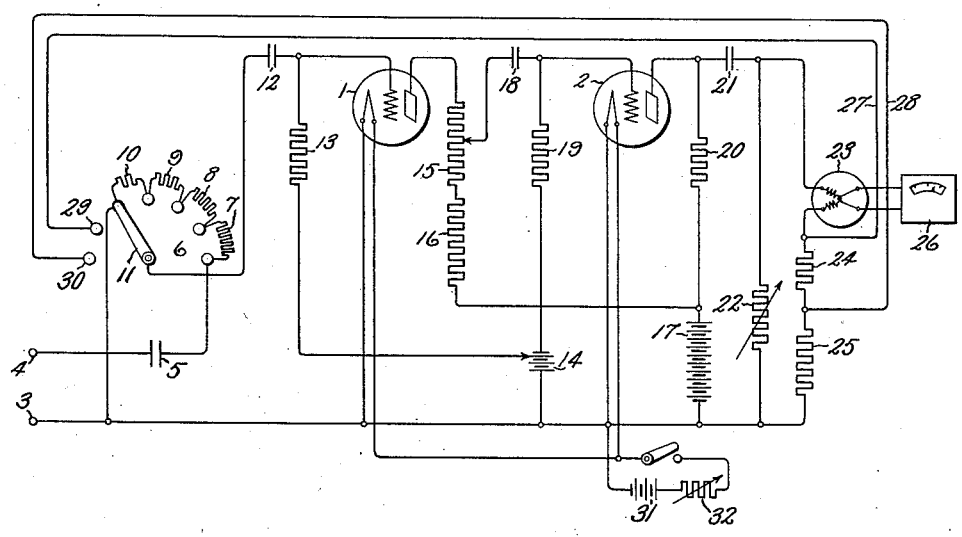
Inventor:
Alda V. Bedford,
by  Harry E. Dunham
His Attorney.

Patented Feb. 19, 1935

1,992,022

UNITED STATES PATENT OFFICE 1,992,022

ELECTRICAL MEASURING APPARATUS

Alda V. Bedford, Collingswood, N. J., assignor to General Electric Company, a corporation of New York Application October 4, 1933, Serial No. 692,095

8 Claims. (Cl. 175—183)

My invention relates to electrical measuring apparatus and more particularly to such apparatus utilizing electron discharge devices for the measurement of small alternating currents and voltages.

In electron discharge or vacuum tube amplifiers such as used in vacuum tube voltmeters, it often occurs that over a long period of use the measuring apparatus becomes inaccurate, due to changes in the characteristics of the electron discharge devices, or changes in the constants of the circuits due to various causes such as temperature, variations of supply voltages and ageing of tubes. Oftentimes such changes are difficult to detect and in the past it has been customary to check the calibration of such vacuum tube voltmeters by impressing known potentials from an external source across the input circuit of the vacuum tube voltmeter. Such operation has the disadvantage that it is necessary to provide a known source of external voltage each time that the vacuum tube voltmeter is to be used.

It is an object of my invention to provide a method and an arrangement whereby the accuracy of the alternating current measuring apparatus of the vacuum tube voltmeter type may be readily checked or determined without the use of a standard or known external voltage source.

The novel features which I believe to be characteristic of my invention are set forth with particularity in the appended claims. My invention itself, however, both as to its organization and method of operation together with further objects and advantages thereof, will be understood best by reference to the following description taken in connection with the accompanying drawing in which the figure discloses an embodiment of my invention.

Referring to the drawing, I have illustrated therein an alternating current measuring apparatus utilizing two electron discharge devices 1 and 2 connected in cascade relation and coupled by means of a resistance-capacitance coupled circuit. The input of the measuring apparatus includes a pair of terminals 3, 4 of which one terminal 3 is connected to the cathodes of the discharge devices and to the potentiometer 6. The other terminal 4 is connected through a capacitor 5 to a potentiometer switching arrangement 6 so that any portion of the voltage existing across a plurality of resistors 7, 8, 9 or 10 may be impressed upon the input circuit of the amplifier device. These resistors operate as multipliers to change the operating range of the measuring apparatus. The switch arm 11 of the switching apparatus 6 is connected through a coupling capacitor 12 to the control electrode of the electron discharge device 1. A coupling resistor 13 is connected between the control electrode of the discharge device 1 and the cathode through a suitable source of biasing potential 14. The anode circuit of the first electron discharge device includes a variable resistor 15, a coupling resistor 16 and the source of anode potential 17. A movable contact on the resistor 15 is connected through the coupling capacitor 18 to the control electrode of the electron discharge device 2. A coupling resistor 19 is connected between the control electrode of the discharge device 2 and the source of biasing potential 14. The anode circuit of the discharge device 2 is provided with a coupling resistor 20 connected between the anode and the anode source of potential 17. The output of the amplifier is coupled by means of a capacitor 21 to an output circuit comprising two parallel branches, one of which contains the variable resistor 22 and the other contains a thermocouple 23 and fixed resistors 24 and 25. These circuits are connected to the cathode return lead of the amplifier. The thermocouple 23 is connected to a microammeter 26 which serves as an indicating instrument. The leads 27 and 28 connected at the upper extremities of the resistors 24 and 25 are connected respectively to the switch points 29 and 30 of the switching apparatus 6. The cathodes of the electron discharge devices 1 and 2 are energized from a suitable source of potential 31 which may be regulated by a variable resistor 32.

In operating the amplifier, the switch arm 11 is placed upon the contact 30, thereby causing a certain portion of the voltage present in the output circuit to be impressed upon the input circuit of the amplifier. This causes the amplifier to oscillate to a greater and greater degree until a stable condition is obtained. This produces an indication upon the output meter 26 which should be noted. The switch arm 11 may then be placed upon the contact 29 which introduces a different portion of the output voltage into the input of the electron discharge device 1. Oscillation again results and a new reading is obtained upon the indicating instrument 26. The switch arm 11 is then replaced upon the contact arm at the lower extremity of the resistor 7 and a known source of alternating current voltage is connected to the input terminals 3 and 4. The indicating instrument 26 is then calibrated.

When the measuring instrument is then to be used the switch arm 11 is placed upon the contact 30 and the reading of the instrument 26 is observed. The switch arm 11 may then be placed on contact 29. A new reading of the instrument 26 is again observed. These readings should agree with the original readings obtained when the amplifier was first calibrated. Because the amplifier oscillates at the frequency for which the amplification is the greatest, this check of the amplifier by feeding back definite portions of the output voltage is an accurate one inasmuch as any slight changes in the characteristics of the discharge devices or the components comprising the circuits will cause the amplitude of oscillation to be different, thereby producing indications on the meter 26 which will not correspond to the original indications obtained when the instrument was first calibrated. It is therefore apparent that the accuracy of this instrument may be determined each time the instrument is to be used without the necessity of connecting known values of alternating current to the input terminals 3 and 4 for the purpose of checking the calibration.

It is to be understood that in the above description of the method of operating the amplifier, the steps of producing the oscillations and then calibrating the meter may be reversed. The only thing to be observed is that the calibration and the rotation of the indications produced by placing the switch on the contacts 29 and 30 should occur during the same period. The oscillation test utilized before the instrument is placed in service provides a calibration check even though the amplifier has not been used for a considerable period of time.

While I have shown and described my invention in connection with certain specific embodiments, it will, of course, be understood that I do not wish to be limited thereto since it is apparent that the principles herein disclosed are susceptible of numerous other applications, and modifications may be made in the circuit arrangements or in the instrumentalities employed without departing from the scope and spirit of my invention as set forth in the appended claims.

What I claim as new and desire to secure by Letters Patent of the United States:—

1. The method of determining the accuracy of a measuring instrument comprising an electron discharge amplifier which includes causing said electron discharge amplifier to oscillate, and noting the intensity of oscillations produced at the times when said accuracy is to be determined.

2. The method of determining the accuracy of a measuring instrument comprising an electron discharge amplifier which includes causing oscillation of said electron discharge amplifier and noting the intensity thereof at the time of calibration of said instrument, causing oscillation of said electron discharge amplifier whenever the accuracy thereof is to be determined and comparing the intensities of the two oscillations to determine the accuracy of said instrument.

3. The method of operating an electrical apparatus for measuring alternating current including an electron discharge amplifier having an indicating instrument, which comprises causing said amplifier to oscillate and to produce an indication, calibrating said indicating instrument by means of known external input voltages, and at a different period of use of said apparatus causing said amplifier to oscillate and to produce an indication whereby the accuracy of said apparatus may be determined.

4. The method of operating an electrical apparatus for measuring alternating current including an electron discharge amplifier having an input circuit and an output circuit including an indicating instrument, which comprises calibrating said indicating instrument by means of a known external input voltage, feeding a definite portion of the voltage present in the output circuit of said amplifier to the input circuit to cause said amplifier to oscillate and produce an indication, and at different periods of use of said apparatus feeding said definite portion of the output voltage of said amplifier to said input circuit to produce oscillation and an indication whereby the accuracy of said apparatus may be determined.

5. The method of operating an electrical apparatus for measuring alternating current including an electron discharge amplifier circuit having an input circuit and an output circuit including an indicating instrument, which comprises feeding a definite portion of the voltage present in the output circuit of said amplifier to the input circuit thereof to cause said amplifier to oscillate and to produce an indication, calibrating said indicating instrument by applying known external input voltages, and at different periods of use of said apparatus feeding said definite portion of the output voltage of said amplifier to said input circuit to produce oscillation and an indication, and comparing said different indications to determine the accuracy of said apparatus.

6. In an electrical apparatus for measuring alternating electromotive forces, the combination of an electron discharge amplifier having input and output circuits, a source of electromotive force to be measured, an indicating device connected in said output circuit, means connected in series with said indicating device for developing voltages of definite relation to the output voltage, and means for alternately impressing the electromotive force to be measured and the voltage developed by said last means on said input circuit whereby the magnitude of said electromotive force to be measured is indicated by said meter when said electromotive force to be measured is supplied to said input circuit and the accuracy of said indication may be determined when said voltage developed in said output circuit is supplied to said input circuit.

7. In an electrical apparatus for measuring alternating current, the combination of an electron discharge amplifier, an input circuit therefor including a switching device, an output circuit including an indicating device, means including a connection from said output circuit to said switching device whereby definite portions of the output of said amplifier may be impressed upon said input circuit to produce an indication, a source of electromotive force to be measured, and means including said switching device to interrupt said connection from said output circuit to said input circuit and to connect said source of electromotive force to be measured to said input circuit to produce an indication while said connection is interrupted.

8. The combination, in a measuring apparatus, of an electron discharge amplifier, means for supplying voltages to be measured to the input circuit of said electron discharge amplifier, an indicating instrument connected in the output circuit of said amplifier to indicate the magnitude of the voltages to be measured, and switching means for interrupting the supply of voltages to be measured to the input circuit and for supplying thereto voltages from the output circuit thereby to cause said electron discharge amplifier to oscillate, whereby changes in the operating characteristics of said measuring apparatus may be detected by observation of the indications of said indicating instrument.

ALDA V. BEDFORD.